(12) United States Patent
Okabe et al.

(10) Patent No.: US 12,609,636 B2
(45) Date of Patent: Apr. 21, 2026

---

(54) POWER CONVERSION DEVICE

(71) Applicant: KABUSHIKI KAISHA TOYOTA JIDOSHOKKI, Aichi-ken (JP)

(72) Inventors: Kazuya Okabe, Kariya (JP); Keiji Yoshida, Kariya (JP); Masahiro Ichigo, Kariya (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 227 days.

(21) Appl. No.: 18/651,988

(22) Filed: May 1, 2024

(65) Prior Publication Data

US 2024/0405695 A1    Dec. 5, 2024

(30) Foreign Application Priority Data

Jun. 2, 2023    (JP) ................................. 2023-091762

(51) Int. Cl.
H02M 3/335 (2006.01)
H02M 7/5387 (2007.01)

(52) U.S. Cl.
CPC ..... H02M 7/5387 (2013.01); H02M 3/33573 (2021.05)

(58) Field of Classification Search
CPC ........ H02M 3/073; H02M 3/10; H02M 3/135; H02M 3/137; H02M 3/28; H02M 3/315; H02M 3/3155; H02M 3/325; H02M 3/335; H02M 7/10; H02M 7/515; H02M 7/521; H02M 7/53; H02M 7/537; H02M 7/5383; H02M 7/538466; H02M 7/53862; H02M 7/5387; H02M 7/53871; H02M 7/53875; H02M 7/757; H02M 7/79; H02M 3/337; H02M 3/338; H02M 3/3382; H02M 3/3384; H02M 7/538; H02M 7/53806; H02M 7/53832; H02M 7/53835; H02M 7/487; H02M 7/539; H02M 7/23; H02M 7/217; H02M 7/21; H02M 7/12; H02M 7/04; H02M 7/00; H02M 7/5395; H02M 7/483; H02M 1/0009; H02M 3/22; H02M 1/08; H02M 1/36; H02M 3/24; H02M 3/01;

(Continued)

(56) References Cited

U.S. PATENT DOCUMENTS

| | | | | |
|---|---|---|---|---|
| 8,472,219 | B2 * | 6/2013 | Srighakollapu ..... | H02M 7/4807 |
| | | | | 363/65 |
| 9,748,865 | B2 * | 8/2017 | Ayai .................... | H02M 7/5387 |
| 12,119,767 | B2 * | 10/2024 | Zhu ................... | H02M 3/33584 |

FOREIGN PATENT DOCUMENTS

| | | |
|---|---|---|
| JP | H08-196086 | 7/1996 |
| JP | 2018-061300 | 4/2018 |

* cited by examiner

*Primary Examiner* — Jeffrey A Gblende
(74) *Attorney, Agent, or Firm* — GREENBLUM & BERNSTEIN, P.L.C.

(57)    ABSTRACT

A power conversion device includes an inverter and a controller that controls the inverter. The inverter includes a first inverter circuit and a second inverter circuit that are connected in parallel to a power source. A first output terminal of a full-bridge inverter unit and a first terminal are connected to each other. A second output terminal of the full-bridge inverter unit and a second terminal are connected to each other. The second output terminal of the full-bridge inverter unit and the first output terminal of the full-bridge inverter unit are connected to each other at a connecting point. The connecting point and a neutral point terminal are connected to each other.

6 Claims, 6 Drawing Sheets

(58) Field of Classification Search
CPC ......... H02M 3/33569; H02M 3/33507; H02M
2007/4815; H02M 2007/4818; H02M
1/083; H02M 3/33538; H02M 3/33546;
H02M 3/33515; H02M 3/33576; H02M
3/33592; H02M 3/33553; H02M 3/33523;
H02M 3/33561; H02M 3/155; H02M
3/1582; H02M 1/4233; H02M 1/12;
H02M 3/07; H02M 7/219; H02M 7/4815;
H02M 1/0048; H02M 7/4818; H02M
7/4826; H02M 7/4833; H02M 3/33573;
Y02B 70/1491
See application file for complete search history.

POWER CONVERSION DEVICE

CROSS-REFERENCE TO RELATED APPLICATIONS

This application is based upon and claims the benefit of priority from prior Japanese Patent Application No. 2023-091762, filed on Jun. 2, 2023, the entire contents of which are incorporated herein by reference.

BACKGROUND

1. Field

The present disclosure relates to a power conversion device.

2. Description of Related Art

A technique related to a single-phase three-wire inverter that generates single-phase three-wire AC from a DC power source is known (for example, refer to Japanese Laid-Open Patent Publication No. 2018-61300).

FIG. 6 is a circuit diagram showing an example of a single-phase three-wire inverter of a related art. As shown in FIG. 6, a single-phase three-wire inverter X1 of the related art includes an isolated DC/DC converter unit X10, smoothing capacitors C1 and C2, a full-bridge inverter unit X20, and output inductors L1 to L3. The isolated DC/DC converter unit X10 converts DC power output from a power source PW. The smoothing capacitors C1, C2 smooth the DC power converted by the isolated DC/DC converter unit X10. The full-bridge inverter unit X20 includes switching elements A1 to A4 and outputs AC power by appropriately controlling switching of the switching elements A1 to A4.

Specifically, a first wire of a single-phase three-wire system is connected to the connecting point between the switching element A1 and the switching element A2. A second line as a neutral line of the single-phase three-wire system is connected to a neutral point of an isolation transformer and a connecting point of the smoothing capacitor C1 and the smoothing capacitor C2. A third line is connected to a connecting point of the switching element A3 and the switching element A4. The output inductors L1 to L3 are each arranged on the first to third lines to convert the AC power output from the full-bridge inverter unit X20 into sine waves.

The single-phase three-wire inverter X1 of the related art is connected to a device that uses an AC power generated across the first line and the second line or an AC power generated across the second line and the third line. Alternatively, the single-phase three-wire inverter X1 is connected to a device that uses an AC power generated across the first line and the third line, while using the second line as a neutral line. As shown in FIG. 6, the single-phase three-wire inverter X1 of the related art may be connected to a device A that uses an AC power generated across the first line and the second line, but is not connected to a device that uses an AC power generated across the second line and the third line. This may increase the imbalance between the load between the first line and the second line and the load between the second line and the third line. Specifically, to supply power to the device A, the full-bridge inverter unit X20 switches the switching element A1 to cause current to flow through a path RT1 in a direction of discharging the smoothing capacitor C1. When current flows through the path RT1, current through a path RT2 also flows in a direction of charging the smoothing capacitor C2. This discharges the smoothing capacitor C1 and charges the smoothing capacitor C2. Accordingly, the voltage across the ends of the smoothing capacitor C1 is reduced, and the voltage across the ends of the smoothing capacitor C2 is increased. This generates a voltage difference between the AC power generated across the first line and the second line and the AC power generated across the second line and the third line.

To suppress the influence of the difference in voltage, the smoothing capacitor C1 and the smoothing capacitor C2 need to have a sufficiently large capacitance. Since capacitors of a large capacitance are required, it is difficult to reduce the size of the single-phase three-wire inverter X1 of the related art.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a power conversion device includes an inverter and a controller. The inverter is configured to convert power output from a power source into a single-phase three-wire AC power and output the converted single-phase three-wire AC power a first terminal, a second terminal, and a neutral point terminal. The controller is configured to control the inverter. The inverter includes a first inverter circuit and a second inverter circuit that are connected in parallel to the power source. The first inverter circuit and the second inverter circuit each include an isolated DC/DC converter unit that converts the power output from the power source, a smoothing capacitor that smooths a DC power output by the isolated DC/DC converter unit, and a full-bridge inverter unit that converts a DC power generated across opposite ends of the smoothing capacitor to generate a single-phase two-wire AC power across a first output terminal and a second output terminal. The first output terminal of the full-bridge inverter unit in the first inverter circuit and the first terminal are connected to each other. The second output terminal of the full-bridge inverter unit in the second inverter circuit and the second terminal are connected to each other. The second output terminal of the full-bridge inverter unit in the first inverter circuit and the first output terminal of the full-bridge inverter unit in the second inverter circuit are connected to each other at a connecting point. The connecting point and the neutral point terminal are connected to each other.

In another general aspect, a power conversion device includes an inverter and controller. The inverter is configured to convert power output from a power source into a single-phase three-wire AC power and output the converted single-phase three-wire AC power a first terminal, a second terminal, and a neutral point terminal. The controller is configured to control the inverter. The inverter includes an isolated DC/DC converter unit that converts the power output from the power source, a first smoothing capacitor that smooths a DC power output by the isolated DC/DC converter unit, a second smoothing capacitor that smooths the DC power output by the isolated DC/DC converter unit, a first full-bridge inverter unit that converts a DC power generated across opposite ends of the first smoothing capacitor to generate a single-phase two-wire AC power across a first output terminal and a second output terminal, a second full-bridge inverter unit that converts a DC power generated across opposite ends of the second smoothing capacitor to generate a single-phase two-wire AC power across a first output terminal and a second output terminal, and an output inductor. The isolated DC/DC converter unit includes an isolation transformer that includes a single primary-side coil, a first secondary-side coil, and a second secondary-side coil, a primary-side circuit connected to the primary-side coil of the isolation transformer, a first secondary-side circuit connected to the first secondary-side coil, and a second secondary-side circuit connected to the second secondary-side coil. The first smoothing capacitor is provided between two output terminals of the first secondary-side circuits. The second smoothing capacitor is provided between two output terminals of the second secondary-side circuits. The first output terminal of the first full-bridge inverter unit and the first terminal are connected to each other. The second output terminal of the second full-bridge inverter unit and the second terminal are connected to each other. The second output terminal of the first full-bridge inverter unit and the first output terminal of the second full-bridge inverter unit are connected to each other at a connecting point. The connecting point and the neutral point terminal are connected to each other.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Embodiment

A power conversion device 10 according to an embodiment will now be described with reference to the drawings.

Overall Configuration

Figure 1:
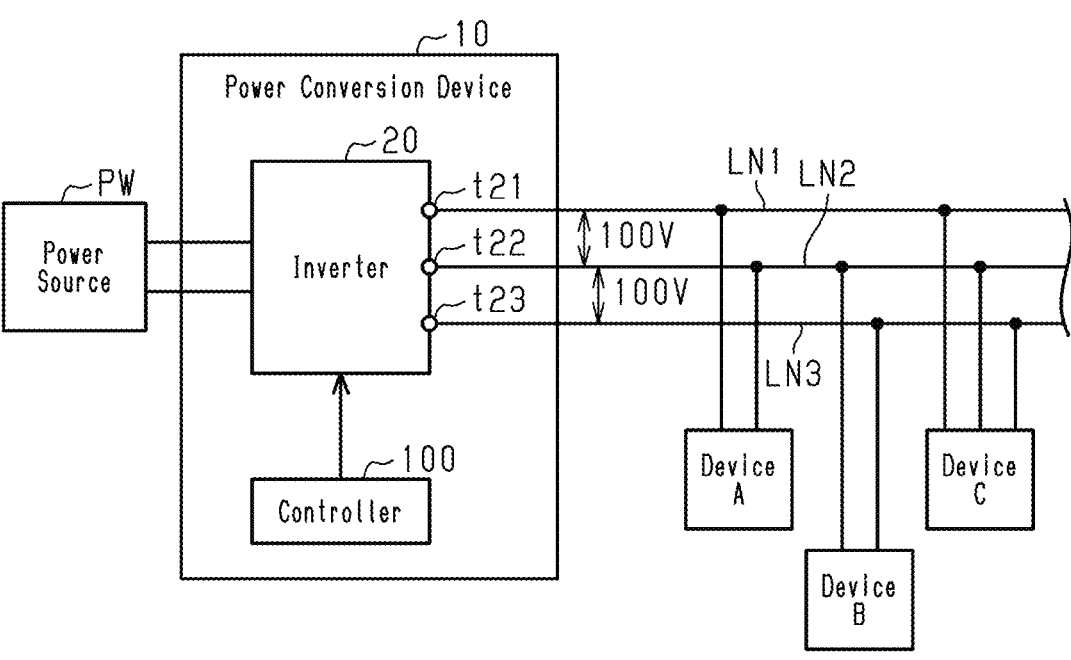
FIG. 1 is an explanatory diagram showing the configuration of a power conversion device.

As shown in FIG. 1, the power conversion device 10 is connected to a power source PW, which supplies a DC power to the power conversion device 10, and to devices supplied with a single-phase AC power supplied by the power conversion device 10. The power source PW is, for example, a battery of a vehicle. The power conversion device 10 is configured to output commercial AC from the battery of the vehicle. The power conversion device 10 may be, for example, a vehicle on-board device or a portable device that is separate from the vehicle. A first line LN1, a second line LN2, and third line LN3 of a single-phase three-wire system are connected to the power conversion device 10. The power conversion device 10 generates a single-phase two-wire AC power of 100 V across the first line LN1 and the second line LN2 and across the second line LN2 and the third line LN3. The power conversion device 10 also generates a single-phase three-wire AC power of 200 V across the first line LN1 and the third line LN3. In the following description, the single-phase two-wire AC power generated across the first line LN1 and the second line LN2 may be referred to as a first phase AC power. Also, the single-phase two-wire AC power generated across the second line LN2 and the third line LN3 may be referred to as a second phase AC power.

In this example, the devices supplied with AC power from the power conversion device 10 are devices A to C. The device A is connected to the first line LN1 and the second line LN2 and is supplied with the first phase AC power. The device B is connected to the second line LN2 and the third line LN3 and is supplied with the second phase AC power. The device C is connected to the first to third lines LN1 to LN3 and is supplied with supplied with the single-phase three-wire AC power.

The power conversion device 10 includes an inverter 20 and a controller 100. The controller 100 is implemented, for example, by a hardware processor such as a central processing unit (CPU) executing programs (software). Some or all of the constituent elements may be implemented by hardware (including circuitry) such as a large scale integration (LSI), an application specific integrated circuit (ASIC), a field-programmable gate array (FPGA), or a graphics processing unit (GPU), or may be implemented by cooperation of software and hardware. The programs may be stored in advance in a storage device (not shown) including a non-transitory storage medium such as a hard disk drive (HDD) or a flash memory in the power conversion device 10. The storage device may be implemented by the various storage devices described above. Alternatively, the storage device may be implemented by an electrically erasable programmable read-only memory (EEPROM), a read-only memory (ROM), a random access memory (RAM), or the like. The controller 100 controls the inverter 20 so that the inverter 20 outputs a single-phase two-wire AC power and a single-phase three-wire AC power.

Configuration of Inverter 20

Figure 2:
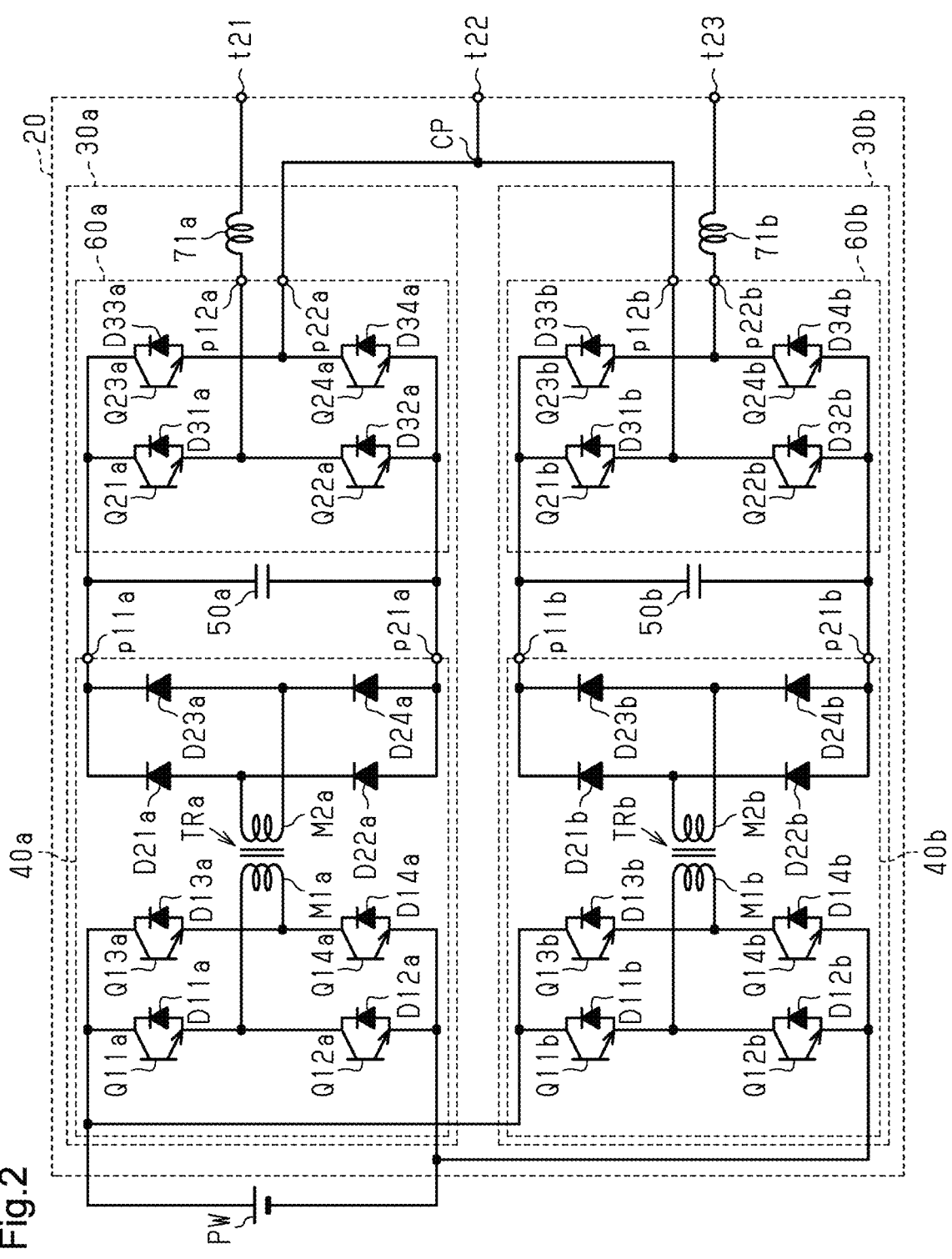
FIG. 2 is a diagram showing an example of the configuration of an inverter of the power conversion device shown in FIG. 1.

As shown in FIG. 2, the inverter 20 includes, for example, a first inverter circuit 30a, a second inverter circuit 30b, a first terminal t21, a neutral point terminal t22, and a second terminal t23. The first inverter circuit 30a and the second inverter circuit 30b basically have the same configuration. In the following description, a suffix "a" is added to the end of a reference numeral for each component included in the first inverter circuit 30a, and a suffix "b" is added to the end of a reference numeral for each component included in the second inverter circuit 30b. The configuration of the first inverter circuit 30a will now be described. For the configuration of the second inverter circuit 30*b*, the description for the components of the first inverter circuit 30*a* are applicable by substituting the suffix "b" for the suffix "a" at the end of the reference numerals. In the following description, when the components of the first inverter circuit 30*a* and the components of the second inverter circuit 30*b* are not distinguished from each other, the suffixes "a" and "b" are omitted. When the first inverter circuit 30*a* and the second inverter circuit 30*b* are not distinguished from each other, they are simply referred to as the inverter circuit 30.

The first inverter circuit 30*a* includes, for example, an isolated DC/DC converter unit 40*a*, a smoothing capacitor 50*a*, a full-bridge inverter unit 60*a*, and an output inductor 71*a*.

The isolated DC/DC converter unit 40*a* includes a switching element Q11*a*, a switching element Q12*a*, a switching element Q13*a*, a switching element Q14*a*, a freewheeling diode D11*a*, a freewheeling diode D12*a*, a freewheeling diode D13*a*, a freewheeling diode D14*a*, an isolation transformer TRa, a diode D21*a*, a diode D22*a*, a diode D23*a*, a diode D24*a*, a first output terminal p11*a*, and a second output terminal p21*a*. The isolation transformer TRa includes a primary-side coil M1*a* and a secondary-side coil M2*a*. In the isolation transformer TRa, the primary-side coil M1*a* and the secondary-side coil M2*a* are insulated from each other.

The switching elements Q11*a* to Q14*a* and the freewheeling diodes D11*a* to D14*a* are implemented by, for example, power switching elements such as insulated gate bipolar transistors (IGBTs). The switching elements Q11*a* to Q14*a* are connected to the freewheeling diodes D11*a* to D14*a*, respectively. Specifically, the freewheeling diode D11*a* is connected to the switching element Q11*a*, the freewheeling diode D12*a* is connected to the switching element Q12*a*, the freewheeling diode D13*a* is connected to the switching element Q13*a*, and the freewheeling diode D14*a* is connected to the switching element Q14*a*. The cathodes of the freewheeling diodes D11*a* to D14*a* are connected to the collectors of the corresponding switching elements Q11*a* to Q14*a*, and the anodes of the freewheeling diodes D11*a* to D14*a* are connected to the emitters of the corresponding switching elements Q11*a* to Q14*a*.

The switching elements Q11*a* and Q12*a* are connected in series to each other by a connection line. The connection line is connected to one end of the primary-side coil M1*a*. The switching elements Q13*a* and Q14*a* are connected to each other by a connection line. The connection line is connected to the other end of the primary-side coil M1*a*. The collectors of the switching elements Q11*a* and Q13*a* are connected to the positive terminal, which is the high-voltage side, of the power source PW. The emitters of the switching elements Q12*a* and Q14*a* are connected to the negative terminal, which is the low-voltage side, of the power source PW. Accordingly, the switching elements Q11*a* to Q14*a* form a full-bridge inverter.

The cathodes of the diodes D21*a* and D23*a* are connected to the first output terminal p11*a*. The anodes of the diodes D22*a* and D24*a* are connected to the second output terminal p21*a*. The anode of the diode D21*a*, the cathode of the diode D22*a*, and one end of the secondary-side coil M2*a* are connected together. The anode of the diode D23*a*, the cathode of the diode D24*a*, and the other end of the secondary-side coil M2*a* are connected together. Thus, the diodes D21*a* to D24*a* form a diode bridge to rectify AC into DC.

In the isolated DC/DC converter unit 40*a*, the switching elements Q11*a* to Q14*a* are switched based on the control by the controller 100. Accordingly, the isolated DC/DC converter unit 40*a* converts the DC power output from the power source PW and generates the converted DC power across the first output terminal p11*a* and the second output terminal p21*a*. The switching elements Q11*a* to Q14*a* are an example of a primary-side circuit connected to the primary-side coil M1*a* of the isolation transformer TRa. The diodes D21*a* to D24*a* are an example of a secondary-side circuit connected to the secondary-side coil M2*a* of the isolation transformer TRa. The first output terminal p11*a* and the second output terminal p21*a* are an example of two output terminals of the secondary-side circuit.

One end of the smoothing capacitor 50*a* is connected to the first output terminal p11*a*, and the other end is connected to the second output terminal p21*a*. The smoothing capacitor 50*a* smooths the DC power converted by the isolated DC/DC converter unit 40*a*.

The full-bridge inverter unit 60*a* includes a switching element Q21*a*, a switching element Q22*a*, a switching element Q23*a*, a switching element Q24*a*, a freewheeling diode D31*a*, a freewheeling diode D32*a*, a freewheeling diode D33*a*, a freewheeling diode D34*a*, a first output terminal p12*a*, and a second output terminal p22*a*.

The switching elements Q21*a* to Q24*a* and the freewheeling diodes D31*a* to D34*a* are implemented by, for example, power switching elements such as IGBTs. The switching elements Q21*a* to Q24*a* are connected to the freewheeling diodes D31*a* to D34*a*, respectively. Specifically, the freewheeling diode D31*a* is connected to the switching element Q21*a*, the freewheeling diode D32*a* is connected to the switching element Q22*a*, the freewheeling diode D33*a* is connected to the switching element Q23*a*, and the freewheeling diode D34*a* is connected to the switching element Q24*a*. The cathodes of the freewheeling diodes D31*a* to D34*a* are connected to the collectors of the corresponding switching elements Q21*a* to Q24*a*, and the anodes of the freewheeling diodes D31*a* to D34*a* are connected to the emitters of the corresponding switching elements Q21*a* to Q24*a*.

The switching elements Q21*a* and Q22*a* are connected in series to each other by a connection line. The switching elements Q23*a* and Q24*a* are connected in series to each other by a connection line. The collectors of the switching elements Q21*a* and Q23*a* are connected to the first output terminal p11*a* and one end of the smoothing capacitor 50*a*. The emitters of the switching elements Q22*a* and Q24*a* are connected to the second output terminal p21*a* and the other end of the smoothing capacitor 50*a*.

The first output terminal p12*a* is connected to a connection line that connects the switching element Q21*a* and the switching element Q22*a* to each other. The second output terminal p22*a* is connected to a connection line that connects the switching element Q23*a* and the switching element Q24*a* to each other. Accordingly, the switching elements Q21*a* to Q24*a* form a full-bridge inverter.

In the full-bridge inverter unit 60*a*, the switching elements Q21*a* to Q24*a* are switched based on the control by the controller 100. Accordingly, the full-bridge inverter unit 60*a* converts a DC power generated across the ends of the smoothing capacitor 50*a*, and generates the converted AC power across the first output terminal p12*a* and the second output terminal p22*a*.

The first output terminal p12*a* of the full-bridge inverter unit 60*a* is connected to one end of the output inductor 71*a*, and the other end of the output inductor 71*a* is connected to the first terminal t21. The second output terminal p22*a* of the full-bridge inverter unit 60*a* and the first output terminal p12*b* of the full-bridge inverter unit 60*b* are connected to each other at a connecting point CP. The connecting point CP is connected to the neutral point terminal t22. The second output terminal p22b of the full-bridge inverter unit 60b is connected to one end of the output inductor 71b, and the other end of the output inductor 71b is connected to the second terminal t23. The first terminal t21 is connected to the first line LN1, the neutral point terminal t22 is connected to the second line LN2, and the second terminal t23 is connected to the third line LN3. The second line LN2 is thus a neutral line. Accordingly, the output inductors 71a, 71b convert the AC power output from the full-bridge inverter units 60a, 60b into sine waves.

In other words, the full-bridge inverter unit 60a generates a first phase AC power across the first output terminal p12a and the second output terminal p22a. In other words, the full-bridge inverter unit 60b generates a second phase AC power across the first output terminal p12b and the second output terminal p22b. The controller 100 controls the full-bridge inverter units 60a, 60b to control the phases of the first phase AC power and the second phase AC power, thereby outputting a single-phase three-wire AC power to the first to third lines LN1 to LN3. The control signal to the full-bridge inverter unit 60a is independent from the control signal to the full-bridge inverter unit 60b.

Operation of Embodiment

In the power conversion device 10, the second output terminal p22a of the full-bridge inverter unit 60a and the first output terminal p12b of the full-bridge inverter unit 60b are connected to each other at the connecting point CP. The connecting point CP and the neutral point terminal t22 are connected to each other. This configuration achieves the separation of the neutral point between the full-bridge inverter unit 60a, which generates the first-phase AC power, and the full-bridge inverter unit 60b, which generates the second-phase AC power.

Advantages of Embodiment

The above-described embodiment has the following advantages.

(1) The power conversion device 10 is less likely to cause a difference in voltage between the smoothing capacitor 50a and the smoothing capacitor 50b even when the imbalance in load between the first phase AC power and the second phase AC power increases, for example, when the power conversion device 10 is connected to only a device that is supplied with the first phase AC power or only to a device that is supplied with the second phase AC power. Therefore, the power conversion device 10 does not need to use a capacitor having a sufficiently large capacitance to compensate for the voltage difference between the smoothing capacitor 50a and the smoothing capacitor 50b. This allows the size of the power conversion device 10 to be reduced.

(2) The output inductor 71a is provided between the first output terminal p12a of the first inverter circuit 30a and the first terminal t21. The output inductor 71b is provided between the second output terminal p22b of the second inverter circuit 30b and the second terminal t23. This configuration allows the output inductor 71 to convert the first phase AC power and the second phase AC power generated by the power conversion device 10 into sine waves.

(3) The isolated DC/DC converter units 40a, 40b are DC/DC converters that operate in a way similar to inverters. The isolated DC/DC converter unit 40 includes the isolation transformer TR, which includes the primary-side coil M1 and the secondary-side coil M2, the switching elements Q11 to Q14 as the primary-side circuits connected to the primary-side coil M1 of the isolation transformer TR, and the diodes D21 to 24D as the secondary-side circuits connected to the secondary-side coil M2 of the isolation transformer TR. The smoothing capacitor 50 is arranged between the first output terminal p11 and the second output terminal p21, which are two output terminal of the secondary-side circuit.

This configuration allows the power conversion device 10 to increase the frequency of the AC input to the isolation transformer TR in the primary-side circuit of the isolated DC/DC converter unit 40. This allows the size of the isolation transformer TR to be reduced. In addition, since each of the first inverter circuit 30a and the second inverter circuit 30b includes the secondary-side coil M2, the separation of the neutral point is achieved. The configuration of the power conversion device 10 thus allows the size of the smoothing capacitor 50 to be reduced. As a result, the size of the power conversion device 10 can be reduced. In addition, in the power conversion device 10, even when an abnormal voltage or current is generated in one of the full-bridge inverters 60, the diodes D21 to D24 and the isolation transformer TR of the secondary-side circuit prevent the other full-bridge inverter 60 from being affected, so that the other full-bridge inverter 60 continues to output the single-phase two-wire AC.

Modifications

The above-described embodiment may be modified as follows. The above-described embodiment and the following modifications can be combined as long as the combined modifications remain technically consistent with each other. In the description of the following modifications, like or the same reference numerals are given to those components that are like or the same as the corresponding components of the above-described embodiment and detailed explanations are omitted.

The full-bridge inverter units 60a, 60b of the above-described embodiment may include output inductors at the second output terminal p22a and the first output terminal p12b, respectively.

Figure 3:
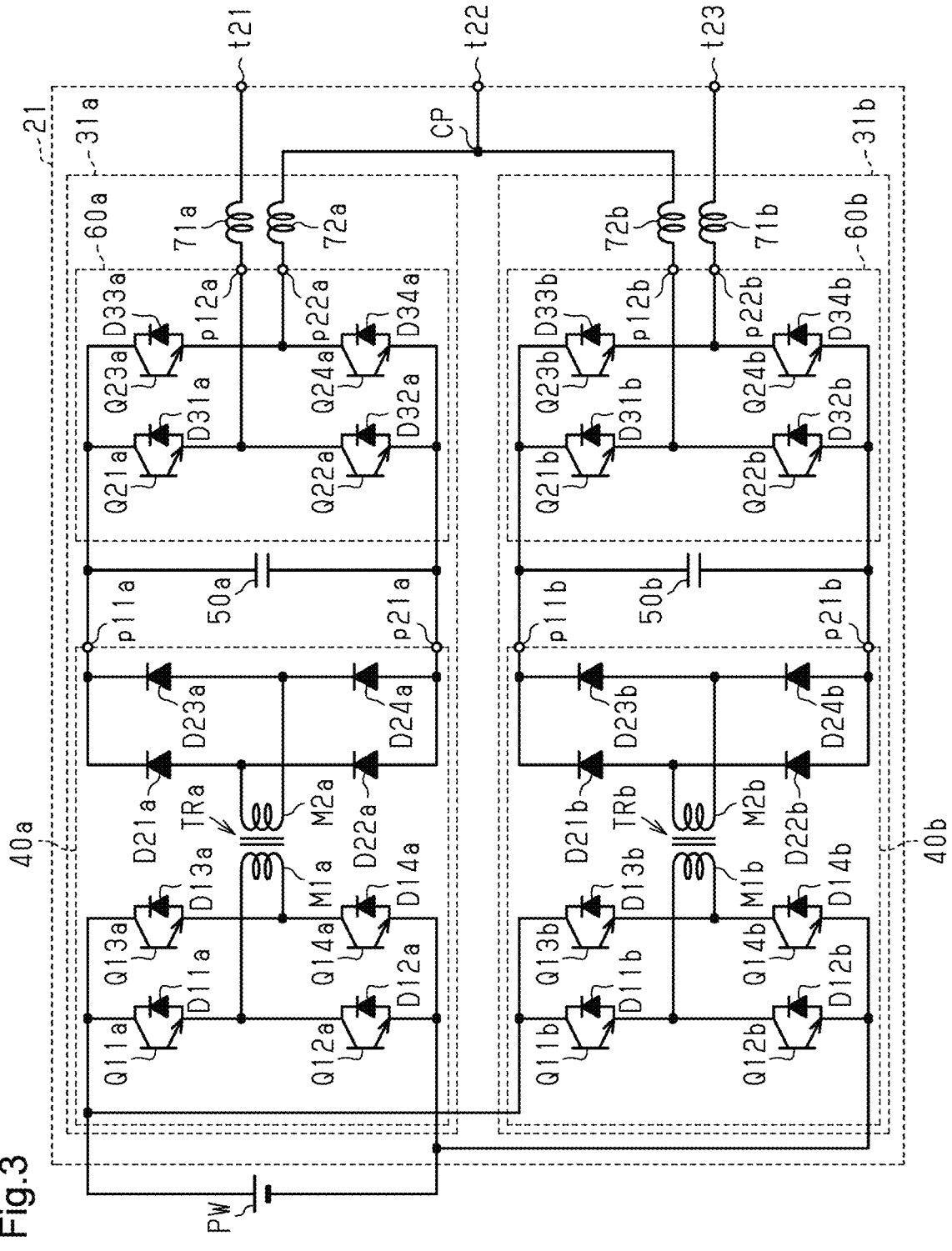
FIG. 3 is a diagram showing an example of the configuration of another inverter.

As shown in FIG. 3, an inverter 21 of a modification includes a first inverter circuit 31a in place of the first inverter circuit 30a, and a second inverter circuit 31b in place of the second inverter circuit 30b. The first inverter circuit 31a includes an output inductor 72a in addition to the configuration of the first inverter circuit 30a. Also, the second inverter circuit 31b includes an output inductor 72b in addition to the configuration of the second inverter circuit 30b. The configuration and connection of the first inverter circuit 31a other than the output inductor 72a are the same as those of the first inverter circuit 30a described above and thus will not be described in detail. Also, the configuration and connection of the second inverter circuit 31b other than the output inductor 72b are the same as those of the second inverter circuit 30b described above and thus will not be described.

In this modification, the second output terminal p22a is connected to one end of the output inductor 72a, and the other end of the output inductor 72a is connected to the connecting point CP. Also, the first output terminal p12b is connected to one end of the output inductor 72b, and the other end of the output inductor 72b is connected to the connecting point CP. This configuration allows the power conversion device 10 to convert the AC power generated by the power conversion device 10 into sine waves.

The full-bridge inverter units 60*a*, 60*b* of the above-described embodiment may include an output inductor in a common section between a path from the second output terminal p22*a* to the neutral point terminal t22 and a path from the first output terminal p12*b* to the neutral point terminal t22.

Figure 4:
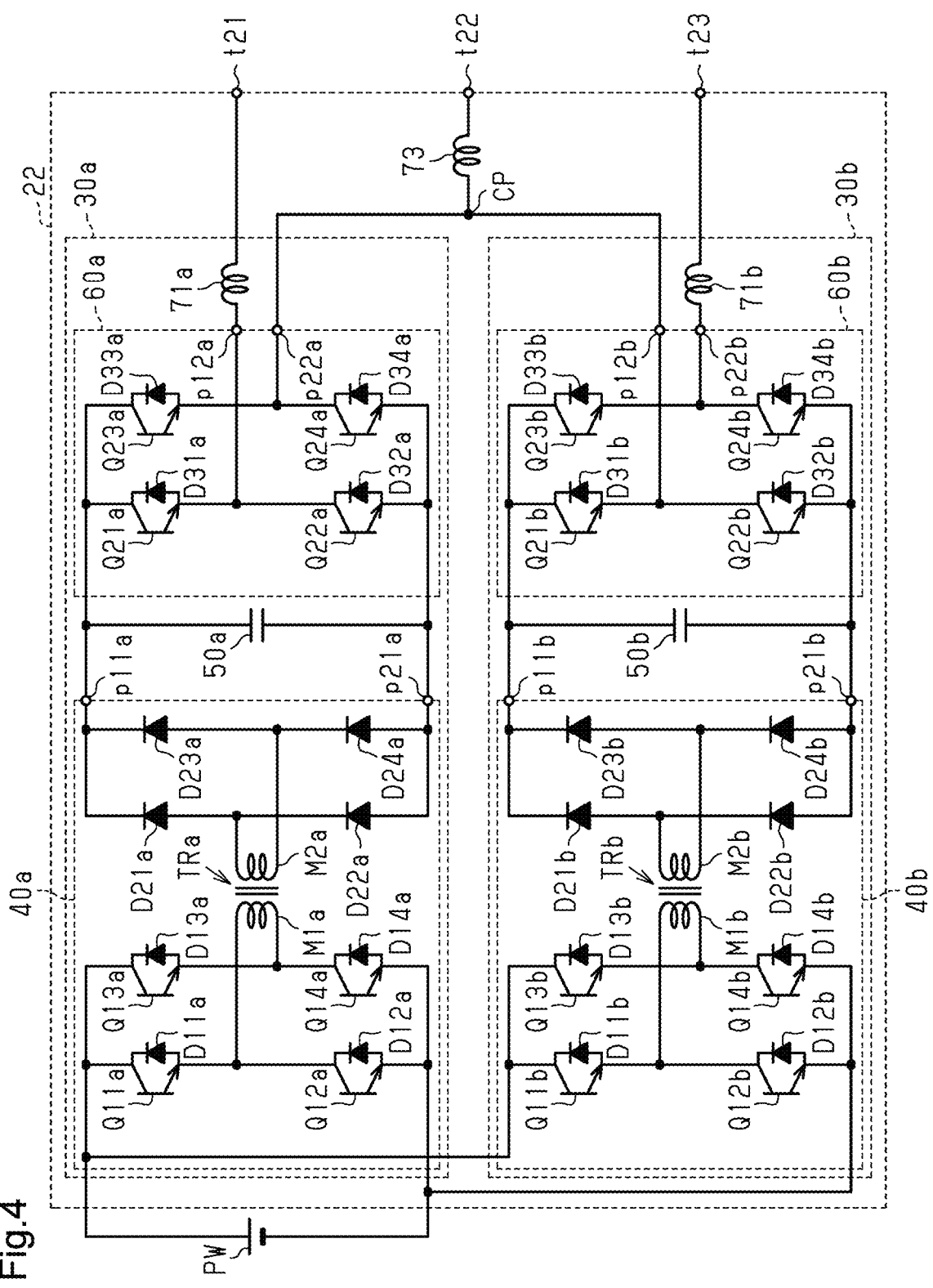
FIG. 4 is a diagram showing an example of the configuration of another inverter.

As shown in FIG. 4, an inverter 22 of a modification includes an output inductor 73 in addition to the configuration of the inverter 20. The configuration and connection of the inverter 22 other than the output inductor 73 are the same as those of the second inverter 20 described above and thus will not be described. One end of the output inductor 73 is connected to the connecting point CP, and the other end is connected to the neutral point terminal t22. This configuration allows the power conversion device 10 to convert the AC power generated by the power conversion device 10 into sine waves.

In the above-described embodiment, the description has been given of the case in which each of the first inverter circuit 30*a* and the second inverter circuit 30*b* includes a primary-side circuit. Hereinafter, a case will be described in which an inverter 23 includes an isolated DC/DC converter unit 41 shared by primary-side circuits.

Figure 5:
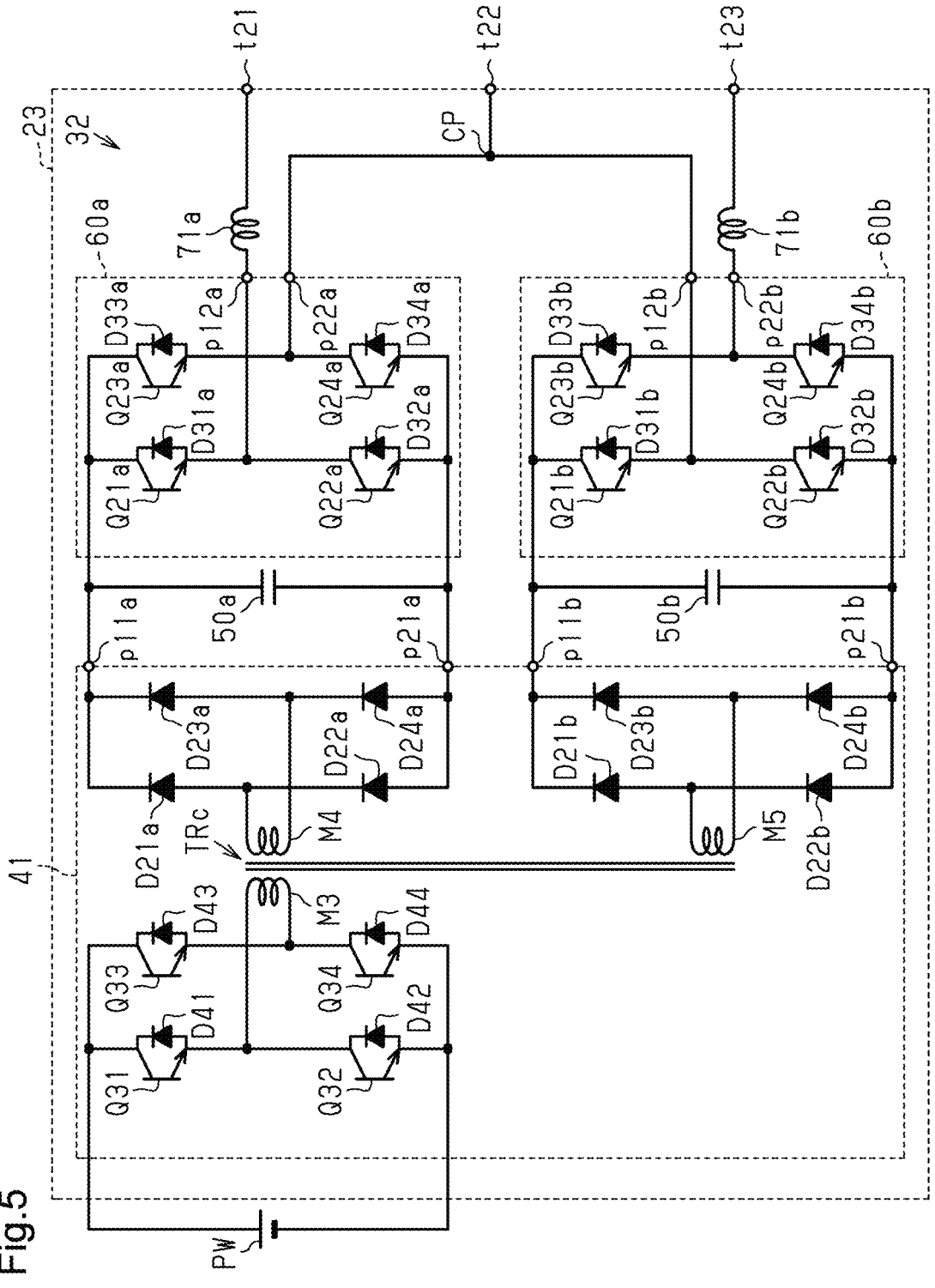
FIG. 5 is a diagram showing an example of the configuration of another inverter.
Figure 6:
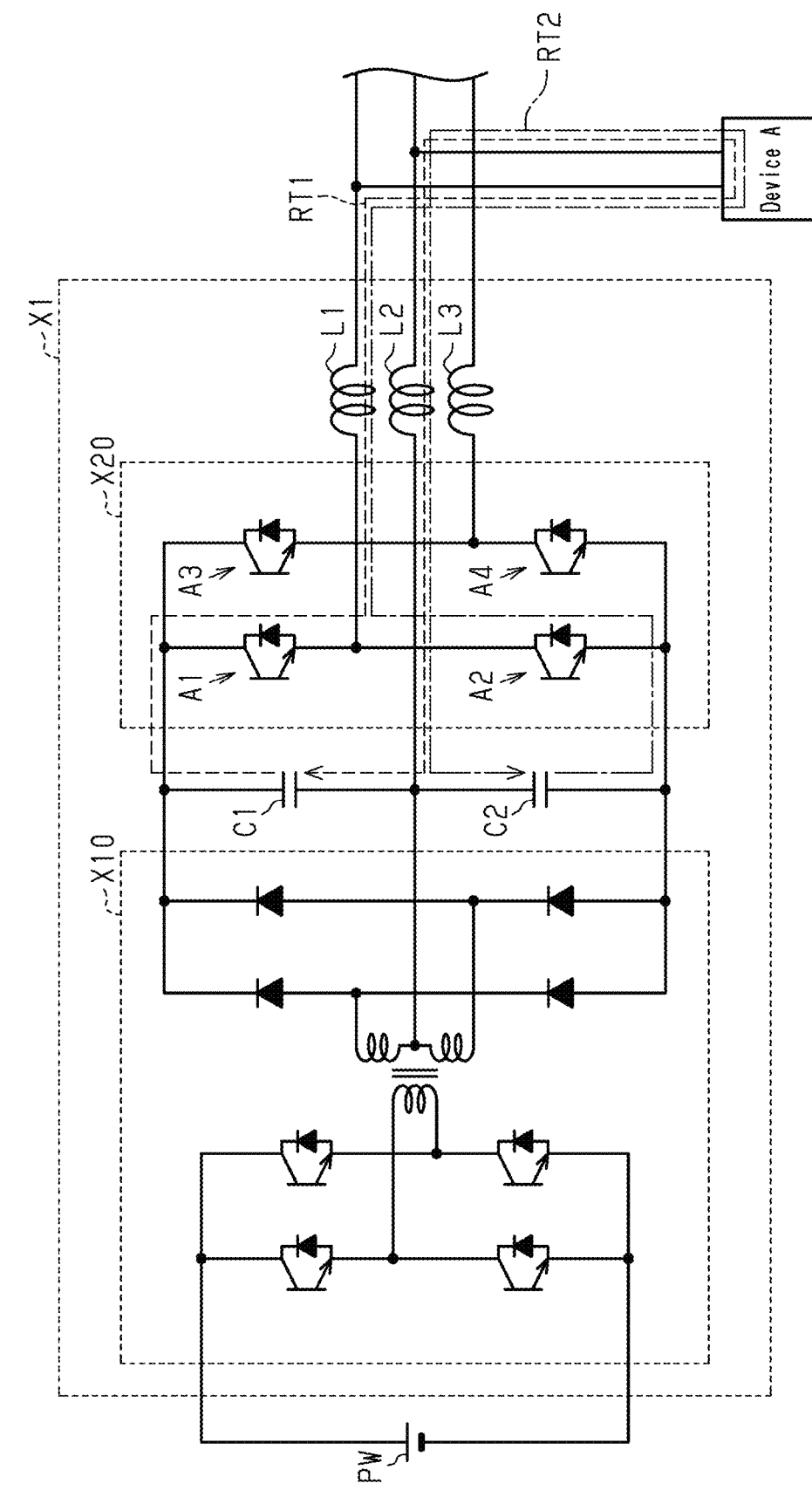
FIG. 6 is a diagram showing a single-phase three-wire inverter of a related art.

As shown in FIG. 5, the inverter 23 includes an inverter circuit 32 in place of the first inverter circuit 30*a* and the second inverter circuit 30*b*. The inverter circuit 32 includes an isolated DC/DC converter unit 41, a smoothing capacitor 50*a*, a smoothing capacitor 50*b*, a full-bridge inverter unit 60*a*, a full-bridge inverter unit 60*b*, an output inductor 71*a*, an output inductor 71*b*, a first terminal t21, a neutral point terminal t22, and a second terminal t23. The components of the inverter circuit 32 that are the same as those of the first inverter circuit 30*a* and the second inverter circuit 30*b* are given the same reference numerals, and detailed explanations are omitted.

The isolated DC/DC converter unit 41 includes a switching element Q31, a switching element Q32, a switching element Q33, a switching element Q34, a freewheeling diode D41, a freewheeling diode D42, a freewheeling diode D43, a freewheeling diode D44, an isolation transformer TRc, diodes D21*a* to D24*a*, diodes D21*b* to D24*b*, first output terminals p11*a*, p11*b*, and second output terminal p21*a*, p21*b*. The isolation transformer TRc includes a primary-side coil M3, a first secondary-side coil M4, and a second secondary-side coil M5. In the isolation transformer TRc, the primary-side coil M3 is insulated from the first secondary-side coil M4 and the second secondary-side coil M5.

The switching elements Q31 to Q34 and the freewheeling diodes D41 to D44 are implemented by, for example, power switching elements such as IGBTs. The switching elements Q31 to Q34 are connected to the freewheeling diodes D41 to D44, respectively. Specifically, the freewheeling diode 41D is connected to the switching element Q31. The freewheeling diode D42 is connected to the switching element Q32. The freewheeling diode D43 is connected to the switching element Q33. The freewheeling diode D44 is connected to the switching element Q34. The cathodes of the freewheeling diodes D41 to D44 are connected to the collectors of the corresponding switching elements Q31 to Q34, and the anodes of the freewheeling diodes D41 to D44 are connected to the emitters of the corresponding switching elements Q31 to Q34.

The switching elements Q31 and Q32 are connected in series to each other by a connection line. The connection line is connected to one end of the primary-side coil M3. The switching elements Q33 and Q34 are connected to each other by a connection line. The connection line is connected to the other end of the primary-side coil M3. The collectors of the switching elements Q31 and Q33 are connected to the positive terminal, which is the high-voltage side, of the power source PW. The emitters of the switching elements Q32 and Q34 are connected to the negative terminal, which is the low-voltage side, of the power source PW. Accordingly, the switching elements Q31 to Q34 form a full-bridge.

The anode of the diode D21*a*, the cathode of the diode D22*a*, and one end of the first secondary-side coil M4 are connected together. The anode of the diode D23*a*, the cathode of the diode D24*a*, and the other end of the first secondary-side coil M4 are connected together. The anode of the diode D21*b*, the cathode of the diode D22*b*, and one end of the second secondary-side coil M5 are connected together. The anode of the diode D23*b*, the cathode of the diode D24*b*, and the other end of the second secondary-side coil M5 are connected together.

With this configuration, the inverter 23 includes a smaller number of components in the primary-side circuit of the isolated DC/DC converter unit 41 than the inverter 20. This configuration achieves the separation of the neutral point between the full-bridge inverter unit 60*a*, which generates the first-phase AC power, and the full-bridge inverter unit 60*b*, which generates the second-phase AC power. This allows the size of the power conversion device 10 to be reduced.

The inverter 23 may include output inductors 72*a*, 72*b* and an output inductor 73. In this case, the connection of the output inductors 72*a*, 72*b* and the output inductor 73 is the same as that of the inverters 21, 22 and thus will not be described.

The power conversion device 10 does not necessarily need to include part or all of the output inductors 71*a*, 71*b*, 72*a*, 72*b*, 73 as long as the AC power output from the power conversion device 10 can be converted into sine waves by parasitic inductance of the circuit wiring of the power conversion device 10 or inductances of the devices connected to the power conversion device 10. Further, the power conversion device 10 does not necessarily need to include the output inductors 71*a*, 71*b*, 72*a*, 72*b*, 73 when the power conversion device 10 outputs pseudo-sine waves or square waves, but does not output sine waves such as a commercial AC.

The power conversion device 10 may include an isolated DC/DC converter unit that is provided by components different from the isolated DC/DC converter units 40*a*, 40*b* as long as the separation of the neutral point of the power conversion device 10 is achieved between the first inverter circuit 30*a* and the second inverter circuit 30*b*. For example, instead of the full-bridge configuration of the switching elements Q11 to Q14, the isolated DC/DC converter unit may have a configuration of a half-bridge and a capacitor (capacitors).

The switching elements Q11 to Q14, the switching elements Q21 to Q24, and the switching elements Q31 to Q34 are not limited to IGBTs and may be, for example, metal-oxide-semiconductor field-effect transistors (MOSFETs).

As long as the power generated across the first line LN1 and the second line LN2 and the power generated across the second line LN2 and the third line LN3 are the same, power other than 100 V may be generated.

As long as the above-described configuration and connection are provided to the power conversion device 10, the connection may be achieved without the first output terminals p11*a*, p11*b*, p12*a*, p12*b*, the second output terminals p21*a*, p21*b*, p22*a*, p22*b*, the first terminal t21, the neutral point terminal t22, or the second terminal t23.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A power conversion device, comprising:
an inverter that is configured to convert power output from a power source into a single-phase three-wire AC power and output the converted single-phase three-wire AC power, the inverter includes a first terminal, a second terminal, and a neutral point terminal; and
a controller that is configured to control the inverter, wherein
the inverter further includes a first inverter circuit and a second inverter circuit that are connected in parallel to the power source,
the first inverter circuit and the second inverter circuit each include:
an isolated DC/DC converter unit that converts the power output from the power source;
a smoothing capacitor that smooths a DC power output by the isolated DC/DC converter unit; and
a full-bridge inverter unit that converts a DC power generated across opposite ends of the smoothing capacitor to generate a single-phase two-wire AC power across a first output terminal and a second output terminal,
the first output terminal of the full-bridge inverter unit in the first inverter circuit and the first terminal are connected to each other,
the second output terminal of the full-bridge inverter unit in the second inverter circuit and the second terminal are connected to each other,
the second output terminal of the full-bridge inverter unit in the first inverter circuit and the first output terminal of the full-bridge inverter unit in the second inverter circuit are connected to each other at a connecting point, and
the connecting point and the neutral point terminal are connected to each other.

2. The power conversion device according to claim 1, wherein
the first inverter circuit and the second inverter circuit each include an output inductor,
the output inductor of the first inverter circuit is provided between the first output terminal of the first inverter circuit and the first terminal, and
the output inductor of the second inverter circuit is provided between the second output terminal of the second inverter circuit and the second terminal.

3. The power conversion device according to claim 1, wherein the first inverter circuit and the second inverter circuit each include an output inductor,
the output inductor of the first inverter circuit is provided between the second output terminal of the first inverter circuit and the connecting point, and
the output inductor of the second inverter circuit is provided between the first output terminal of the second inverter circuit and the connecting point.

4. The power conversion device according to claim 1, further comprising an output inductor,
wherein the output inductor is provided between the connecting point and the neutral point terminal.

5. The power conversion device according to claim 1, wherein
the isolated DC/DC converter units are each a DC/DC converter that operates in a way similar to inverters,
the isolated DC/DC converter units each include:
an isolation transformer including a primary-side coil and a secondary-side coil;
a primary-side circuit connected to the primary-side coil of the isolation transformer; and
a secondary-side circuit connected to the secondary-side coil of the isolation transformer, and
the smoothing capacitors are each provided between two output terminals of the corresponding secondary-side circuit.

6. A power conversion device, comprising:
an inverter that is configured to convert power output from a power source into a single-phase three-wire AC power and output the converted single-phase three-wire AC power, the inverter includes a first terminal, a second terminal, and a neutral point terminal; and
a controller that is configured to control the inverter,
the inverter further includes:
an isolated DC/DC converter unit that converts the power output from the power source;
a first smoothing capacitor that smooths a DC power output by the isolated DC/DC converter unit;
a second smoothing capacitor that smooths the DC power output by the isolated DC/DC converter unit;
a first full-bridge inverter unit that converts a DC power generated across opposite ends of the first smoothing capacitor to generate a single-phase two-wire AC power across a first output terminal and a second output terminal;
a second full-bridge inverter unit that converts a DC power generated across opposite ends of the second smoothing capacitor to generate a single-phase two-wire AC power across a first output terminal and a second output terminal; and
an output inductor,
the isolated DC/DC converter unit includes:
an isolation transformer that includes a single primary-side coil, a first secondary-side coil, and a second secondary-side coil;
a primary-side circuit connected to the primary-side coil of the isolation transformer;
a first secondary-side circuit connected to the first secondary-side coil; and
a second secondary-side circuit connected to the second secondary-side coil,
the first smoothing capacitor is provided between two output terminals of the first secondary-side circuits,
the second smoothing capacitor is provided between two output terminals of the second secondary-side circuits,
the first output terminal of the first full-bridge inverter unit and the first terminal are connected to each other, the second output terminal of the second full-bridge inverter unit and the second terminal are connected to each other, the second output terminal of the first full-bridge inverter unit and the first output terminal of the second full-bridge inverter unit are connected to each other at a connecting point, and the connecting point and the neutral point terminal are connected to each other.

* * * * *